No. 756,960. Patented April 12, 1904.

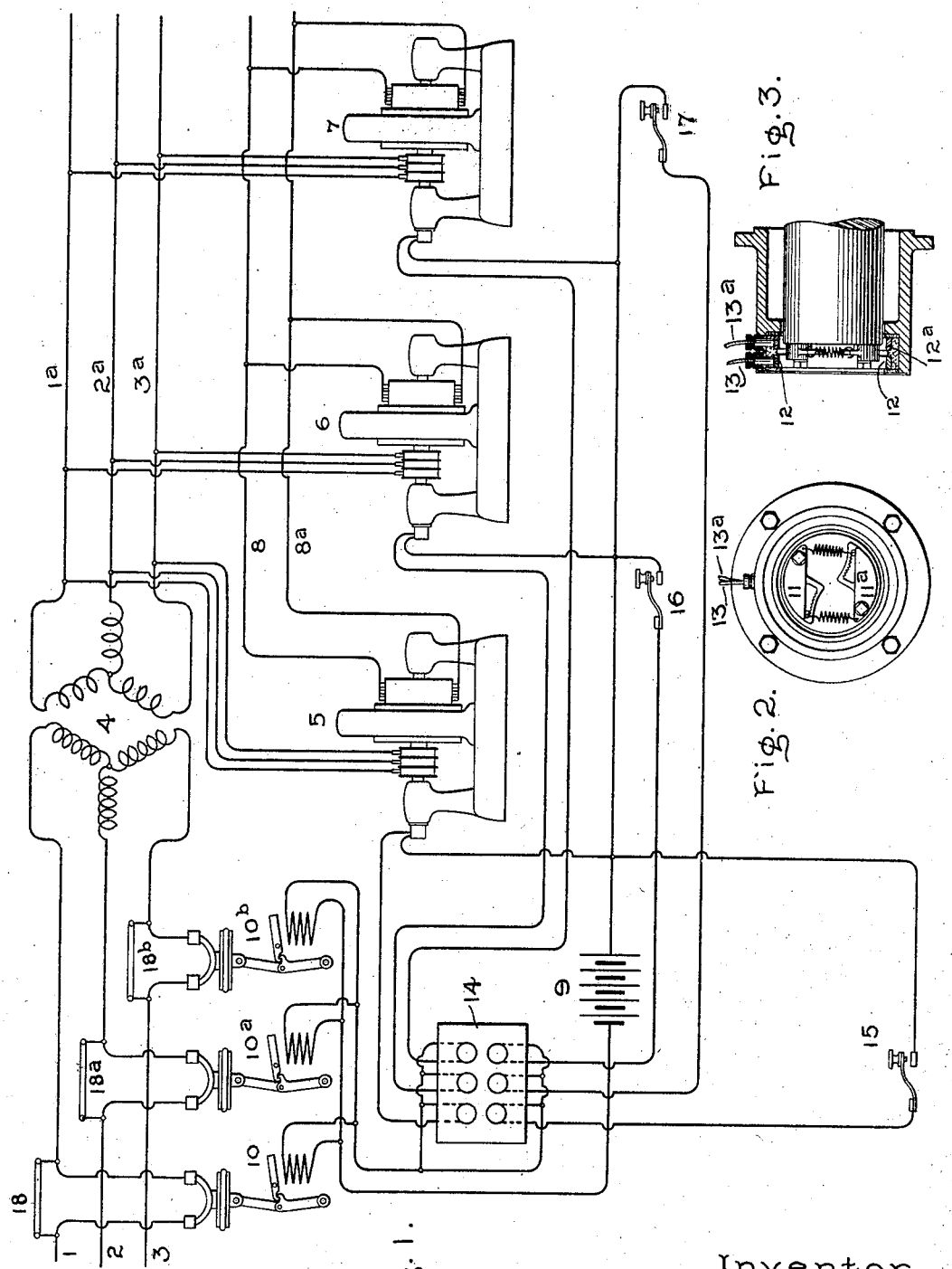

UNITED STATES PATENT OFFICE.

EDWARD M. HEWLETT, OF SCHENECTADY, NEW YORK, ASSIGNOR TO THE GENERAL ELECTRIC COMPANY, A CORPORATION OF NEW YORK.

ROTARY-CONVERTER SYSTEM.

SPECIFICATION forming part of Letters Patent No. 756,960, dated April 12, 1904.

Application filed July 24, 1899. Serial No. 724,909. (No model.)

*To all whom it may concern:*

Be it known that I, EDWARD M. HEWLETT, a citizen of the United States, residing at Schenectady, county of Schenectady, State of New York, have invented certain new and useful Improvements in Rotary-Converter Systems, of which the following is a specification.

The object of this invention is to provide for the automatic interruption of an electric circuit, and more especially a circuit supplying a system of distribution through a plurality of rotary converters when the conditions of the system require for its safe operation such interruption.

A further object of the invention is to indicate or record the point in the system at which difficulty may arise.

In the conversion of alternating currents at a main or subdistributing station by means of rotary converters it sometimes happens that by reason of an abnormal increase of frequency of the generator or by reason of some conditions in the operation of a particular converter one or more of the converters will rise to an abnormal speed or "runaway," and there has been provided for such an emergency a centrifugal device operated by the rotary converter by which a circuit is closed, including the operating-coil of an automatic circuit-breaker. Where a battery or plurality of converters are employed, it requires some time to locate the particular machine, if only one machine is affected, which operated the switch.

It is the object of my invention to control the circuit-breaker by any one of a plurality of machines and to give a permanent indication, by means of an annunciator or other suitable indicating device, as to which particular machine operated the circuit-breaker.

It is a further object to permit the circuit-breaker to be operated by the station attendant from any desired point in the station at which the conditions indicate the necessity for the interruption of the circuit and to leave also on an annunciator a permanent notice of the point from which the circuit-breaker was operated.

In carrying out the invention I connect the tripping-coils of an automatic circuit-breaker in multiple-arc relation to a circuit controlled by a plurality of rotary converters, including in the several branches of the multiple-arc circuit an annunciator. In other parallel branches of the multiple-arc circuit I include circuit-controllers capable of manual operation, which are located at desired points in or near a generating or distributing station for use by attendants, including in these branches also drop-coils of the annunciator.

In the accompanying drawings I have shown by way of example a triphase alternating-current circuit supplying through a transformer a plurality of rotary converters connected with a common distributing direct-current circuit. It will of course be evident to those familiar with the art that an alternating-current circuit of any character may be employed to feed the rotary converters, a triphase system being shown merely by way of example.

Figure 1 is a diagram of a system embodying my improvements. Fig. 2 is an end view of one of the rotary-converter shafts, showing the centrifugal relay or circuit-controller; and Fig. 3 is a median sectional view showing the construction of said circuit-controller.

1 2 3 represent three leads from a generator of alternating currents feeding the primary of a transformer 4, the secondary of which connects with the distributing-leads $1^a$ $2^a$ $3^a$. Connected in parallel relation to the latter are a plurality of rotary converters 5 6 7, having one member charged with direct current from a local or other source and the other element receiving alternating current on a plurality of brushes, according to the number of phases in the supply-circuit, and delivering from a commutator in a manner well understood by those familiar with the art direct current to a distribution-circuit 8 $8^a$. It sometimes happens that under abnormal increase of speed of the supply-generator, and consequent increase in the frequency of the current supplied to the converters, the latter are driven at an abnormal or dangerous speed, in which case it becomes necessary to disconnect them from the supply-circuit. It may also happen that by reason of some conditions local with a particular machine its field-magnet strength may be weakened and the machine thereby be permitted to rise to a dangerous speed. In order to provide for such contingencies, each machine is provided with a centrifugal circuit controller or relay mounted on its shaft, by which when the speed reaches a dangerous value a branch circuit from a local source of direct current 9 may be closed through the tripping-coils of the automatic circuit-breaker 10 $10^a$ $10^b$. A convenient structure for such a circuit-controller is shown in detail in Figs. 2 and 3, in which 11 $11^a$ are two weighted levers pivoted at one end to a standard or support screwed eccentrically into the end of the rotary shaft. The ends of the levers are connected by springs the tension of which may be adjusted so as to regulate its sensitiveness of action. A convenient form is shown in the drawings, in which one end of the spring is fastened at or near the pivotal point of one lever and the other end provided with a hook which may be placed in any one of a number of grooves or notches formed in a yoke or arm extending along the edge of the other lever at its free end. It will be obvious upon an inspection of the drawings that adjustment of the movable end of each spring will vary the sensitiveness of the device by subjecting it to a different degree of tension in the several positions of adjustment when the free arms of the levers are thrown out by centrifugal action.

Mounted on or secured to the standard which supports the shaft of the converter are two metal rings 12 $12^a$, insulated from one another and connected with two leads 13 $13^a$, in circuit with a local source of current 9, which operates the tripping-coil for the circuit-breaker 10 $10^a$ $10^b$. Thus when any converter attains an improper or dangerous speed the free ends of the levers 11 $11^a$ are forced outwardly by centrifugal action against the tension of the retracting-springs and bridge the metal rings 12 $12^a$, thereby closing the circuit from the source 9 through the particular centrifugal relay or circuit-closer operated, thence through a corresponding coil of an annunciator 14, through the coils of the circuit-breaker 10 $10^a$ $10^b$ in parallel, back to the battery.

The circuit-breaker may be of any suitable type, that shown being of a type well known in the art, in which the two circuit contacts or terminals are bridged by a bundle of laminæ controlled by a spring-actuated toggle, which may be latched under tension by a lever carrying an armature controlled by a releasing-coil. As devices of this character are well understood in the art, I deem it unnecessary to illustrate or describe it in detail.

Each of the converters 5 6 7 is similarly provided with a centrifugal circuit-controller connected through a separate corresponding annunciator-drop and controlling the circuit-breaker in a manner similar to the one just discussed. I provide also in the controlling-circuit of the circuit-breaker a plurality of manual circuit-controllers 15 16 17, which may be located at points adjacent to the converter and at other points about the distributing-station at which it may be desirable to locate them for the control of the main-circuit-interrupting device. Thus any damage to any part of the circuit-breaker may be either automatically or hand controlled from a plurality of points and a record made of the points at which such control is effected to facilitate rapidity of inspection or repair. The circuit-breakers are provided with devices for subduing the arc at the point of rupture, that employed in the system illustrated in the drawings being a fuse 18 $18^a$ $18^b$, shunting the terminals and permitting the circuit to be opened at the terminals without an arc, after which the fuse is blown and the circuit interrupted.

What I claim as new, and desire to secure by Letters Patent of the United States, is—

1. The combination of a source of current, a distributing-circuit supplied thereby, a plurality of centrifugal circuit-controllers at different distributed points in the distributing-station, a circuit-breaker for the supply-circuit controlled thereby, and an indicator operated by the several circuit-controllers to show which circuit-controller has been operated.

2. The combination of an electric supply-circuit, a plurality of rotary converters operated thereby, circuit-controllers operated by the respective converters upon abnormal fluctuation of speed, a circuit-interrupter for the supply-circuit controlled in common by the said controllers, and a plurality of indicators in circuit with the respective circuit-controllers.

3. The combination of an electric supply-circuit, a plurality of rotary converters connected therewith, an automatic circuit-breaker for the main circuit, a plurality of automatic circuit-controllers for said circuit-breaker corresponding to the several converters and operated upon dangerous increase of speed, a plurality of hand-controlled circuit-controllers, and an annunciator having a series of drops corresponding to the respective circuit-controllers.

4. The combination with a rotary converter, of a circuit-breaker in one of the converter-circuits, a centrifugal circuit-controller on the rotary member of the converter, contact-rings engaged thereby at a predetermined speed, and circuit connections leading therefrom to the trip-coil of the circuit-breaker.

In witness whereof I have hereunto set my hand this 21st day of July, 1899.

EDWARD M. HEWLETT.

Witnesses:
BENJAMIN B. HULL,
CAROLYN L. HAYNES.